Jan. 27, 1959  M. F. PETERS  2,870,617
CONTROL OF TORQUE AND FLUID FLOW IN SEALED DRIVES
Filed April 26, 1954
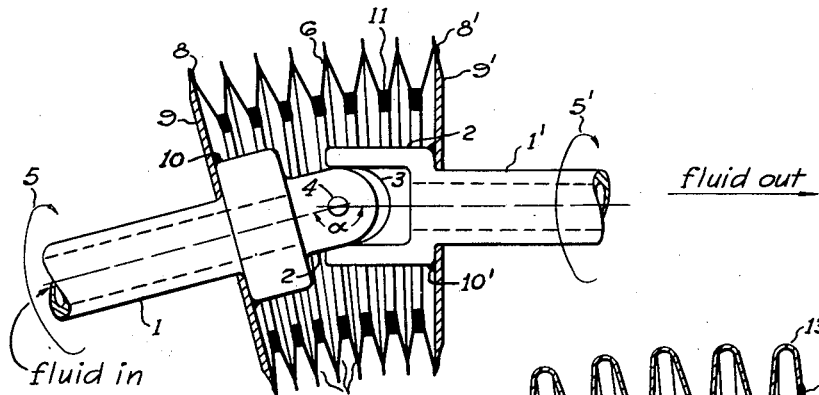
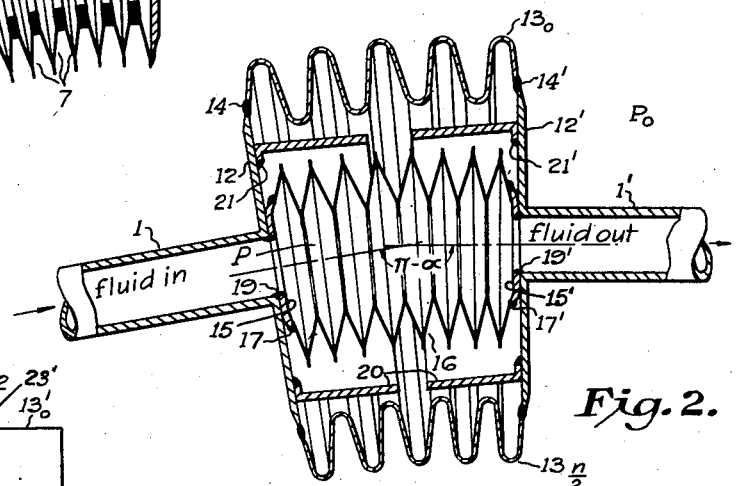
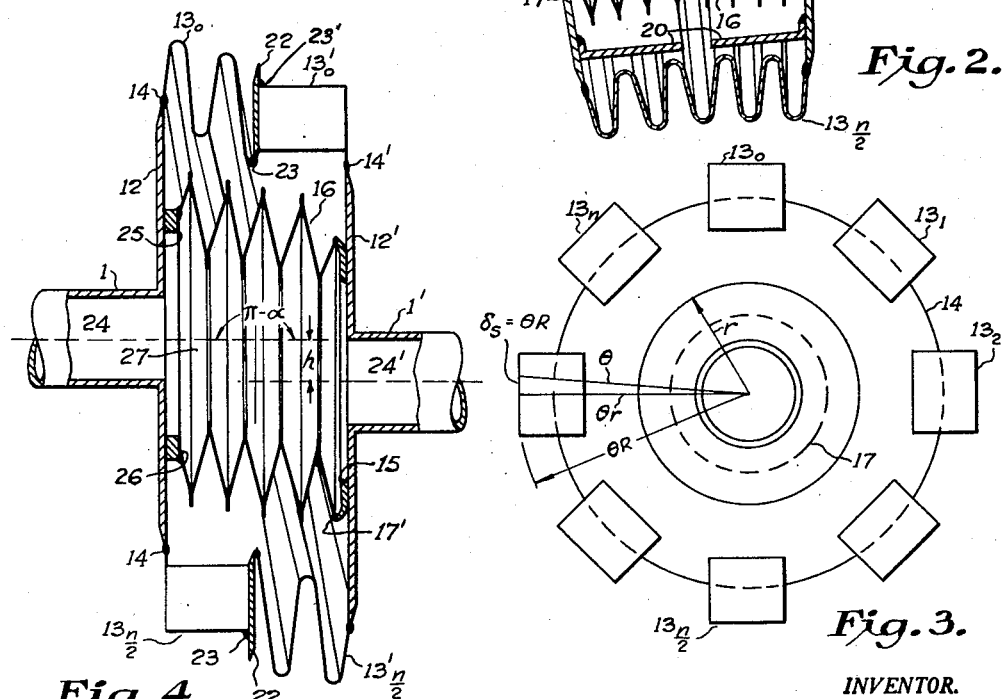
INVENTOR.
Melville F. Peters
BY
Martin J. Finnegan
ATTORNEY

United States Patent Office

2,870,617
Patented Jan. 27, 1959

2,870,617

CONTROL OF TORQUE AND FLUID FLOW IN SEALED DRIVES

Melville F. Peters, Livingston, N. J.

Application April 26, 1954, Serial No. 425,669

6 Claims. (Cl. 64—32)

This invention relates to combining flexible fluid seals with universal joints, couplings and other types of supporting structures and in particular with flexible assemblies which allow the two ends of the assembly to move independently of each other in all directions except the direction of rotation which is used for transmitting torque.

When bellows are used for the dual purpose of forming a fluid seal and transmitting the torque or twisting forces between two rotating hollow shafts or tubes, the stresses developed in the bellows will be high if the operation requires relatively large torques and bellows displacements. The stresses developed in the bellows can be reduced to values which are well below the proportional limit allowed for the material in the bellows, if a flexible supporting structure is placed between the two ends of the bellows to transmit the torque between the rotating shafts and to use the bellows mainly for sealing and transmitting the fluid. It is therefore the first object of the invention to combine a flexible mechanical structure with a flexible fluid seal, so that the unit may be used to transmit mechanical and fluid energy without stressing the component parts of the assembly beyond the elastic limit.

When power is transmitted through a universal joint there will be a small angular rotation between the two ends of the flexible element and as these contacting parts wear, this angular rotation will increase. When the joint must be hermetically sealed so that fluid can be retained or transmitted between the two ends of the joint, the rotating elements may be inclosed in a bellows which is attached to suitably arranged shoulders, so that the bellows and shoulders confine the joint in a fluid tight chamber. To be sure that the universal joint will not bind with change in temperature it is necessary to allow clearance between the rotating surfaces so that a small angular displacement always takes place in the joint when there is a change in the angular accelerations. This angular displacement is greater than the conventional bellows can withstand without exceeding the elastic limit of the material. If the bellows is modified so that it permits an angular rotation of at least ±10 degrees without exceeding the elastic limit of the material in the membranes, the combination of a flexible fluid seal which allows both rotation and extension can be combined with the universal joint, so that the stresses developed in the flexible seal will remain below the elastic limit during the transmission of energy through the joint. It is therefore the second object of the invention to combine a universal joint with a flexible fluid seal which can be extended or rotated through a small angle, between the two ends of the joint.

In some installations it is necessary to transmit power through fluid tight chambers where bearing and moving contacting surfaces can not be tolerated. When the rotating forces or torques are great enough to require a reinforcing structure to act in conjunction with a bellows, it is necessary to select a reinforcing structure which does not have rubbing surfaces. This reinforcing structure must maintain the stresses in the bellows below the elastic limit and at the same time allow the rotating shafts to move independently of each other in all directions except the direction of rotation, which is the direction by which power is transmitted through the flexible sealing assembly. It is therefore the third object of the invention to connect the flexible fluid seal to the adjacent ends of the rotating elements to form a fluid tight chamber and to place a supporting structure between the adjacent ends of the chamber, so that the supporting structure permits a movement of each element which is independent of the other element, except in the direction in which the rotating forces are transmitted through the flexible assembly.

When the flexible fluid seal is subjected to a relatively high internal fluid pressure and the axis of rotation of the two shafts are at an angle less than $\pi$, the bellows will be deformed during each revolution of the two shafts more than is required to correct for the misalignment of the shafts. This deformation of the bellows can be controlled by surrounding at least a portion of the fluid seal with a restraining element. It is therefore a fourth object of the invention to provide a restraining surface so that the bellows can not be deformed beyond a predetermined value.

When the axis of rotation of one end of the seal is parallel but not in line with the axis of rotation of the other end, the transmission of mechanical power through the seal can be done with a flexible fluid coupling. If the operating temperatures are high, the contacting moving surfaces must be eliminated and the transmission of mechanical power from one rotating shaft to the other shaft must take place through a flexible mechanical coupling which allows the two shafts to move independently of each other in all directions except the direction of rotation common to both shafts and this direction lies in the plane normal to the axis of rotation. Since the bellows can not withstand shear and consequently it can not withstand an appreciable movement normal to its axis, provision must be made for at least one end of the bellows to move freely. This can be accomplished by putting a rotary or sliding seal on the free end of the bellows. It is therefore a fifth object of the invention to conduct fluid between two rotating elements by attaching not more than one end of the bellows to one of the rotating elements and to form a sliding seal between the free end of the bellows and the second rotating element and to transmit the mechanical forces or torque applied to one rotating element to the second element by using a mechanical structure which permits movement in all directions except the rotary motion which is normal to the axis of the rotating shaft.

In the drawing:

Figure 1 is a cross sectional view of a conventional type of universal joint surrounded by a flexible fluid seal which can be elongated and also rotated through a fractional part of 2 radians, an embodiment of the invention.

Figures 2 and 3 are cross sectional views of the side and end views of a flexible fluid seal with guiding surfaces for transmitting fluids and a mechanical structure for transmitting rotary motions, an embodiment of the invention.

Figure 4 is a cross sectional view of a bellows forming a fluid seal between two ends of a coupling which are rotating about axis which are parallel to each other but are not in line and a plurality of elements to transmit the torque between the two ends which permit a movement of one combination of elements which are independent of the other combination of elements except in the direction of rotation, an embodiment of the invention.

In Figure 1 the universal joint consists of two yokes 2 and 2′ mating with the spherical segment 3 and pin 4 passing through the spherical segment and the two yokes, so that the rotation of the shaft 1 in the direction of the arrow 5, will cause the hollow shaft 1′ to rotate in the direction of arrow 5' and in like manner if the rotation of the hollow shaft 1 is reversed, the direction of rotation of shaft 1' will be reversed, but the combination of the yokes 2, 2', the spherical segment 3 and pin 4, will permit the two hollow shafts or tubes to operate at an angle $\alpha$. At 8 and 8' is secured the two ends of the bellmets 6 to the two plates or shoulders 9 and 9' which are secured to 1 and 1' respectively at 10 and 10'. The bellmets consists of a plurality of plates 7 welded together on their outer peripheries and bonded together on their inner peripheries at 11 with silastic resin such as an assembly being described in my patent application filed July 2, 1951, Serial Number 239,607, now abandoned, wherein the word "bellmets" is defined as a fluid seal having controlled mechanical, electrical and/or thermal properties. Tests conducted upon bellmets show that the opposite ends of a bellmets 1 inch long can be rotated through an angle of ±35 degrees at 450 p. s. i. over a temperature range of −70° F. to 350° F. during stroking of the bellmets without exceeding the proportional limit of the metal plates or the silastic resins. These three properties, resistance to deformation at high pressures, rotation of at least ±10 degrees between end plates and change in length with change in force along the axis, must be incorporated into the flexible sealing element of the universal joint, since rapid accelerations of shaft 1', with a consequent small rotation of one end plate with respect to the other plate.

When the universal joints are new and the angular rotation between the two ends of the seal are small, a bellows may be bonded to shoulders 9 and 9' at 10 and 10', with a short but sometimes satisfactory life. An example of such an installation is the guided missile where the operating period is a matter of minutes.

When the temperature is too high to permit the use of silastic resins the bellows 16 in Figures 2 and 3 is attached to the tube 1 which is supplied with a shoulder 12 attached to one end of the strip $13_0$ at 14 and the other end of the strip is secured to the shoulder 12' of tube 1' at 14' and in like manner similar corrugated strips $13_1$—$13_n$ have their two ends attached at 14 and 14' to 12 and 12' respectively. One end of bellows 16 is attached to fitting 15 at 17 and the other end of the bellows is attached to 15' at 17'. The two fittings 15 and 15' may be projections of the two tubes 1 and 1' respectively, or may be separate fittings joined to 1 and 1' or 12 and 12' respectively at 19 and 19'. For small angles of $\alpha$ the strips $13_0$—$13_n$ may be made very wide without interfering with the flexibility of the joint. When an impulse is applied to 1, the torque is transmitted to 1' through the bellows 16 and the strips $13_0$—$13_n$. This torque causes a change in the length of the fibers forming the elements $13_0$—$13_n$ and the bellows. To limit the distortion of the bellows the element 20 is secured to 12 and 12' at 21 and 21' respectively. When the pressure differential across the bellows is 100 p. s. i. or less, 20 may be a cylindrical element, but when the pressure differential is above 100 p. s. i. the supporting structure should be formed to control the extended shape of the bellows.

It is within the scope of the invention to supply the supporting structure $13_0$—$13_n$ to bellows installations in valves, so that when the valves are opened and closed the rotating stresses will be assumed by the structure. This follows since the stresses borne by the flexible mechanical structure are independent of the speed of rotation and consequently the mechanical structure serves as a means of shielding the bellows from mechanical stress in both static and dynamic conditions. The use of the elements $13_0$ to $13_n$ eliminates key ways and other rubbing surfaces which are conducive to binding in valves.

In Figure 4 the hollow shaft 1 rotates about the axis 24 and hollow shaft 1' rotates about the axis 24' which is out of alignment with axis 24 by a distance $h$. The flexible strips $13_0$—$13_n$ are connected to shoulders 12 and to ring 22 at 14 and 23 respectively and the flexible strips $13_0'$—$13_n'$ are connected to ring 22 and shoulder 12' at 23' and 14' respectively. One end of bellows 16 is connected to fitting 15' at 17' and the other end of the bellows is connected at its center of pressure to the sliding ring 25 at 26, so that the ring may rotate on the inner surface of 12 to form a fluid seal. When 1 is rotated the torque is transmitted from 1 to 1' through 12, $13_0$—$13_n$, the ring 22, $13_0'$—$13_n'$, 12' and the fluids are sealed in the chamber 27 by the elements 12', 16, 25 and 12. The sliding element 25 describes an ellipse as the assembly is rotated and since the elements for transmitting the torque are independent of the sealing element and have degrees of freedom in all directions but the direction of rotation, the assembly can be used as a fluid tight coupling without moving contacting surfaces.

Each one of the flexible elements $13_0$—$13_n$ consists of one or more laminae, the thickness and number of laminae in each element being dependent upon the required flexibility and the power to be transmitted.

What is claimed is:

1. A torque transmitting mechanism comprising, a pair of rotatable fluid conduits having appositioned, axially spaced terminal flanges, a bellows assembly interconnecting said flanges and a flexible torque transmitting member secured between the flanges to limit the torque imposed upon the bellows during rotation of the conduits.

2. A torque transmitting mechanism comprising, a pair of rotatable fluid conduits having appositioned, axially spaced terminal flanges, a bellows assembly interconnecting said flanges and a plurality of flexible torque transmitting members in the form of corrugated strips secured, between the flanges to limit the torque imposed upon the bellows during the rotation of the conduits.

3. A torque transmitting mechanism comprising, a pair of rotatable fluid conduits having appositioned, axially spaced terminal flanges, a bellows assembly interconnecting said flanges, a flexible torque transmitting member secured between the flanges to limit the torque imposed upon the bellows during the rotation of the conduits and a bellows restraining member interposed between the bellows and the transmitting member to limit axial bellows distortion.

4. A torque transmitting mechanism comprising, a pair of rotatable fluid conduits having appositioned, axially spaced terminal flanges, a bellows assembly interconnecting said flanges, a plurality of flexible torque transmitting members in the form of corrugated strips secured between the flanges to limit the torque imposed upon the bellows during rotation of the conduits and a bellows restraining member interposed between the bellows and the transmitting member to limit axial bellows distortion.

5. A torque transmitting mechanism according to claim 3, in which the restraining members consist of spaced cylindrical members, each attached at one end to one of the terminal flanges.

6. A torque transmitting mechanism according to claim 3, in which the restraining members consist of a cylindrical member attached at each end to one of the flanges.

References Cited in the file of this patent

UNITED STATES PATENTS

| | | |
|---|---|---|
| 1,117,961 | Phillips | Nov. 17, 1914 |
| 1,214,307 | Hosford | Jan. 30, 1917 |
| 1,379,964 | Chilton | May 31, 1921 |
| 1,752,106 | Persons | Mar. 25, 1930 |
| 2,264,728 | Stillwagon et al. | Dec. 2, 1941 |

FOREIGN PATENTS

| | | |
|---|---|---|
| 910,975 | France | Feb. 25, 1946 |